United States Patent
Wang et al.

(10) Patent No.: US 6,998,993 B2
(45) Date of Patent: Feb. 14, 2006

(54) PHOTORESIST PUMP DISPENSE DETECTION SYSTEM

(75) Inventors: Ching-Hui Wang, Hsinchu (TW); Hsien-Chung Chen, Hsinchu (TW); Tsung-Han Peng, Hsinchu (TW)

(73) Assignee: Macronix International Co. Ltd., Hsinchu (TW)

( * ) Notice: Subject to any disclaimer, the term of this patent is extended or adjusted under 35 U.S.C. 154(b) by 239 days.

(21) Appl. No.: 10/387,489

(22) Filed: Mar. 14, 2003

(65) Prior Publication Data

US 2004/0178219 A1   Sep. 16, 2004

(51) Int. Cl.
*G08B 21/00* (2006.01)

(52) U.S. Cl. .................... 340/635; 340/679; 222/1; 216/41; 439/942

(58) Field of Classification Search ............... 340/679, 340/635; 222/1; 417/9, 13; 216/41; 438/942
See application file for complete search history.

(56) References Cited

U.S. PATENT DOCUMENTS

| 5,527,161 A | * 6/1996 | Bailey et al. | 417/53 |
| 6,752,599 B1 | * 6/2004 | Park | 417/46 |

* cited by examiner

*Primary Examiner*—Daniel Wu
*Assistant Examiner*—Travis R. Hunnings
(74) *Attorney, Agent, or Firm*—Akin Gump Strauss Hauer & Feld LLP

(57) ABSTRACT

A detection circuit that includes a first relay coupled to a solenoid valve for sensing an operation state of the solenoid valve, a second relay coupled to the first relay adapted for activating in response to activation of the first relay, a sensor for detecting an operation state of a device, a third relay coupled to the sensor, wherein the senor is adapted for providing a signal to activate the third relay, and wherein the second relay is deactivated in response to the activation of the third relay, and a fourth relay coupled to the first and second relays, wherein the fourth relay is activated when the first relay is deactivated and the second relay is activated.

19 Claims, 7 Drawing Sheets

PHOTORESIST PUMP DISPENSE DETECTION SYSTEM

DESCRIPTION OF THE INVENTION

1. Field of the Invention

This invention relates in general to an electrical circuit and, more particularly, to a detection circuit for dispending a masking material in a photolithography process.

2. Background of the Invention

In the semiconductor industry, fabrication of semiconductor devices may require hundreds of manufacturing steps, including, but not limited to, diffusing, etching, thin film depositing, ion implanting, polishing, and photolithography. A photolithography process generally includes dispensing or coating a layer of masking material such as photoresist or polyimide on a wafer. A block diagram of a conventional system for dispensing photoresist or polyimide is shown in FIG. 1. Referring to FIG. 1, a dispensing system 10 may include a dispense controller 12, a pump controller 14, and a pump 16. Dispense controller 12 is provided to control the dispensation of photoresist. Pump controller 14, electrically coupled to dispense controller 12, is provided to control the operation of pump 16. Pump 16, electrically connected to pump controller 14, is provided to transport a wafer (not shown) to a position where coating of the masking material takes place. Pump 16 may include a printed circuit board ("PCB") 16-2 for signal processing, a stepping motor 16-4 for moving a pump shaft (not shown), and a solenoid valve 16-6 that functions to serve as a switch.

In operation, dispense controller 12 issues a command to pump controller 14 to start the coating process. Pump controller 14 activates stepping motor 16-4 and solenoid valve 16-6 through PCB 16-2. Stepping motor 16-4 moves the pump shaft upward to a desired position, and solenoid valve 16-6 opens to release photoresist or polyimide. Dispense controller 12 may issue a command to stop the coating process. In which case, stepping motor 16-4 moves the pump shaft downward and solenoid valve 16-6 closes.

System 10 provides two-way signal communications between dispense controller 12 and pump controller 14, and between pump controller 14 and PCB 16-2. However, communications between stepping motor 16-4 or solenoid valve 16-6 and pump controller 14 are only one way. As a result, if stepping motor 16-4 or solenoid valve 16-6 malfunctions, dispense controller 12 may continue to operate, resulting in possible damage to dispensing system 10, and the wafer.

SUMMARY OF THE INVENTION

Accordingly, the present invention is directed to a detection circuit that obviates one or more of the problems due to limitations and disadvantages of the related art.

To achieve these and other advantages, and in accordance with the purpose of the invention as embodied and broadly described, there is provided a detection circuit that includes a first relay coupled to a solenoid valve for sensing an operation state of the solenoid valve, a second relay coupled to the first relay adapted for activating in response to activation of the first relay, a sensor for detecting an operation state of a device, a third relay coupled to the sensor, wherein the sensor is adapted for providing a signal to activate the third relay, and wherein the second relay is deactivated in response to the activation of the third relay, and a fourth relay coupled to the first and second relays, wherein the fourth relay is activated when the first relay is deactivated and the second relay is activated.

In one aspect, each of the first, second, third, and fourth relays includes a first relay contact at an open position and a second relay contact at a closed position.

Also in accordance with the present invention, there is provided a system for dispensing a masking material in a semiconductor manufacturing process that includes a dispense controller for controlling dispensing of a layer of masking material, a pump including a solenoid valve operating in an activated state and a deactivated state, and a detection circuit electrically coupled to the dispense controller and the pump for detecting the operation of the pump and providing to the dispense controller a signal indication the operation of the pump, the detection circuit including a first relay for providing a signal to the dispense controller to deactivate the system when the pump is operating outside specifications of the pump.

Still in accordance with the present invention, there is provided a detection circuit that includes a first relay coupled to a solenoid valve, and activated and deactivated respectively in response to the activation and deactivation of the solenoid valve, the first relay including a first relay contact and a second relay contact, a second relay including a first relay contact and a second relay contact, the first relay contact of the second relay being coupled in parallel to the first relay contact of the first relay and coupled in series with the second relay contact of the first relay so that the second relay is activated in response to the activation of the first relay, a sensor coupled to a pump, a third relay including a first relay contact coupled in parallel to the sensor, and a second relay contact coupled in series with the first relay contact of the first relay, wherein the second relay is deactivated in response to the activation of the third relay; and a fourth relay including a first relay contact and a second relay contact, the first relay contact of the fourth relay being coupled in parallel to the second relay contact of the first relay and the first relay contact of the second relay so that the fourth relay is activated in response to the deactivation of the first relay and the activation of the second relay.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1:
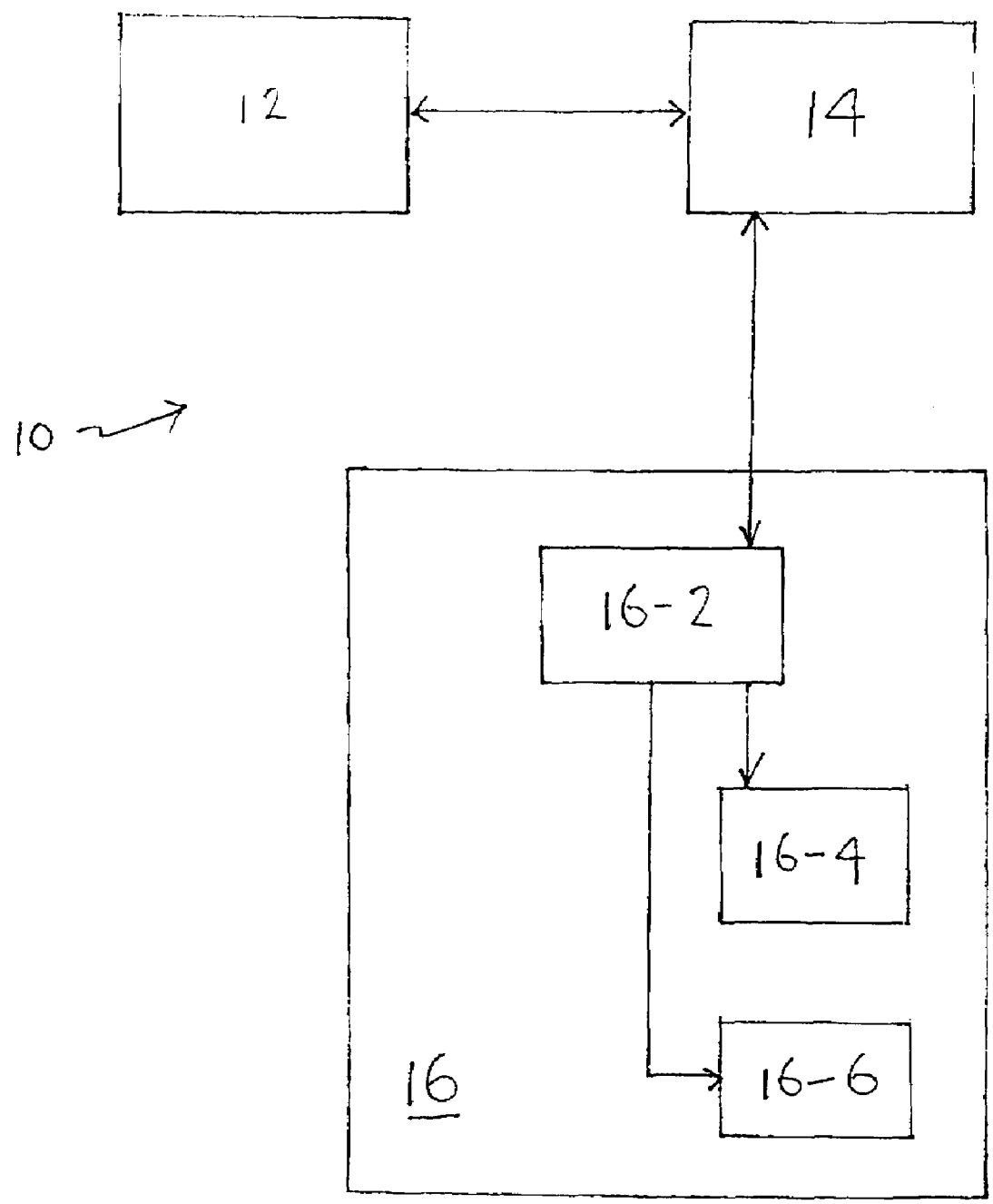
FIG. 1 shows a block diagram of a conventional dispense system.
Figure 2:
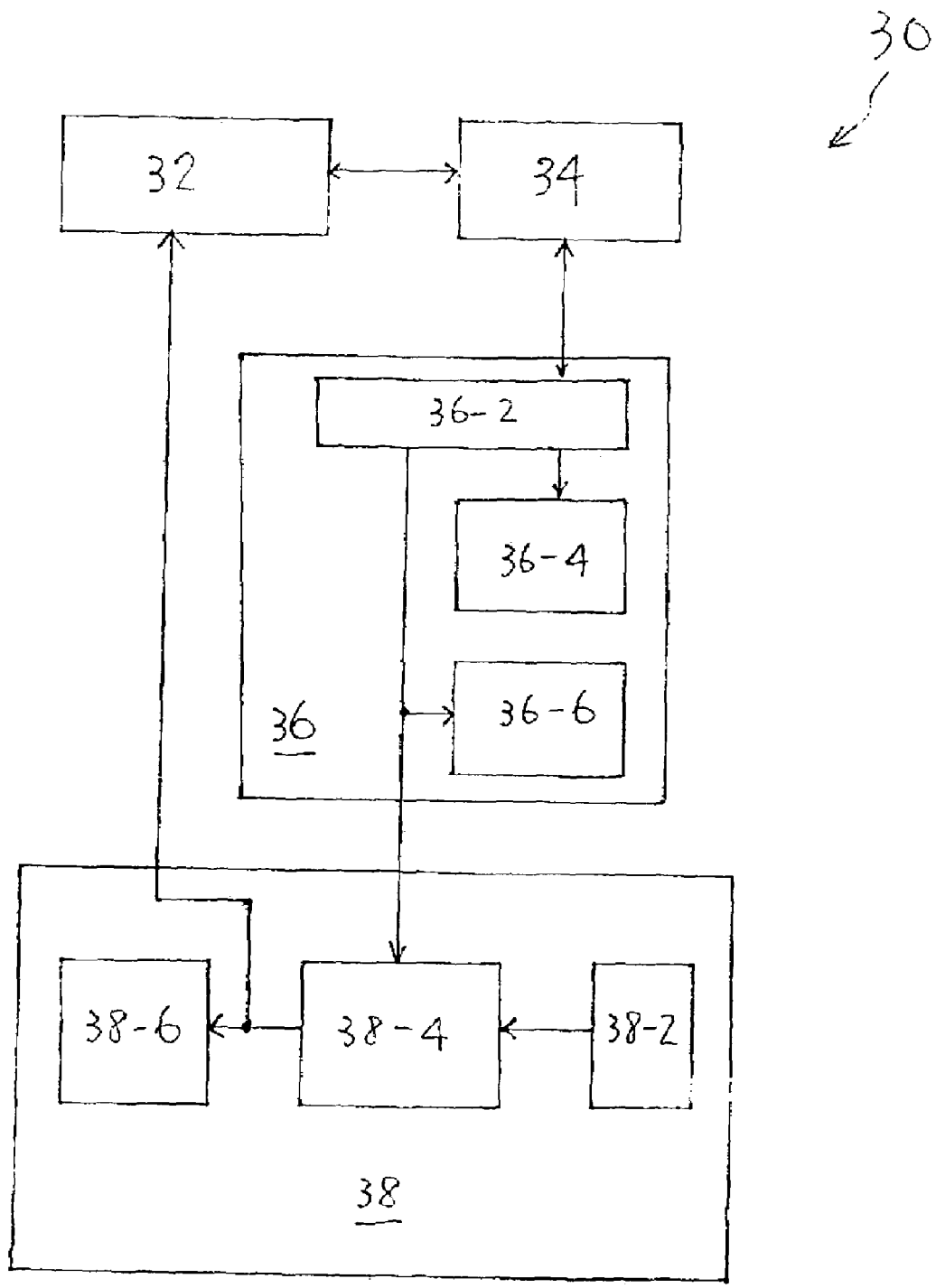
FIG. 2 is a block diagram of a dispensing system in accordance with one embodiment of the present invention.

FIG. 2 is a block diagram of a dispensing system in accordance with one embodiment of the present invention. Referring to FIG. 2, a dispensing system 30 includes a dispense controller 32, a pump controller 34, a pump 36 and a detection circuit 38 electrically coupled to dispense controller 32 and pump 36. Pump 36 includes a printed circuit board ("PCB") 36-2, a stepping motor 36-4 and a solenoid valve 36-6. Dispense controller 32 controls the amount of photoresist or polyimide dispensed on a wafer (not shown). Pump controller 34, in response to a command from dispense controller 32, activates or deactivates stepping motor 36-4 and solenoid valve 36-6 through PCB 36-2.

Detection circuit 38 includes a sensor 38-2 and a main circuit 38-4. Sensor 38-2, electrically coupled to main circuit 36-4, determines the operation of pump 36 and provides a signal to main circuit 36-4 to indicate whether pump 36 is operating within specifications. In one embodiment, sensor 38-2 is stationary respective to a pump shaft (not shown) of a pump 36 to sense the movement of the pump shaft. Main circuit 38-4 determines the state of solenoid valve 36-6 and provides a signal to dispense controller 32. In response to a signal indicating a malfunction or unexpected operation of pump 36, dispense controller 32 stops the operations of dispensing system 30. In one embodiment, detection circuit 38 includes an alarm 38-6, for example, a buzzer, to indicate a system malfunction.

Figure 3A:
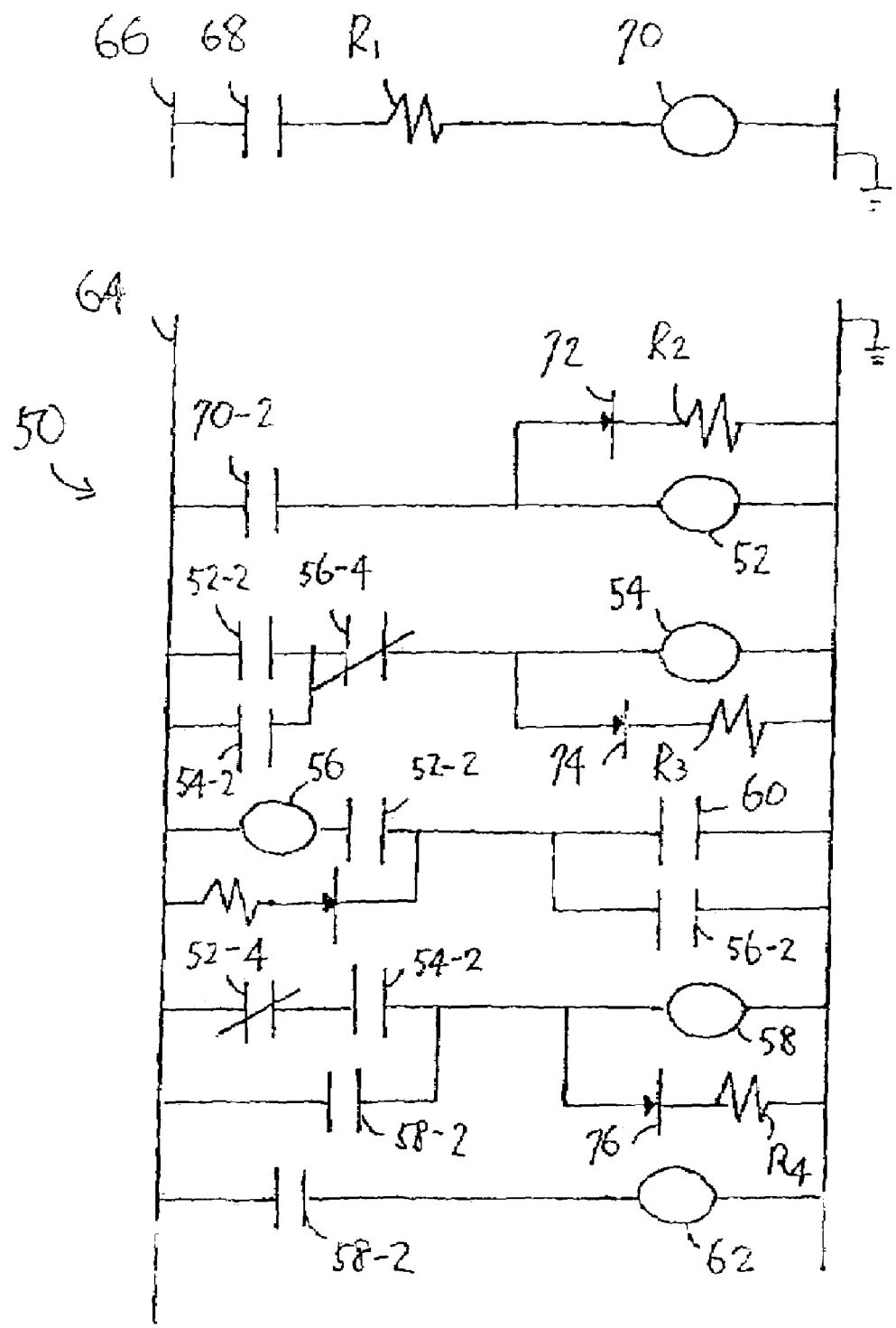
FIGS. 3A to 3D are circuit diagrams of a programmable logic circuit of a detection circuit in accordance with one embodiment of the present invention.

FIGS. 3A to 3D are circuit diagrams of a programmable logic circuit of a detection circuit consistent with one embodiment of the present invention. Referring to FIG. 3A, detection circuit 50 includes a plurality of relays, including a first relay 52, a second relay 54, a third relay 56, a fourth relay 58 and a sensor (not numbered). Each of relays 52, 54, 56 and 58 includes a first and a second relay contacts, although not all of the relay contacts are shown in FIGS. 3A to 3D. In one embodiment, the first relay contacts are normally held at an open position, and the second relay contacts are normally held at a closed position. The closed position of a relay contact provides an electrical connection between the relay and other circuit components coupled to the relay, and the open position disconnects such an electrical path.

Referring again to FIG. 3A, first relay 52 includes a first relay contact 52-2 and a second relay contact 52-4. Second relay 54 includes a first relay contact 54-2. Third relay 56 includes a first relay contact 56-2 and a second relay contact 56-4. Fourth relay 58 includes a first relay contact 58-2. First relay contact 52-2 of first relay 52 is coupled in parallel to first relay contact 54-2 of second relay 54, both of which are coupled in series with second relay contact 56-4 of third relay 56. First relay contact 52-2 of first relay 52 is also coupled in series with a sensor contact 60 of the sensor, and is initially held at an open position, to which first relay contact 56-2 of third relay 56 is coupled in parallel. Second relay contact 52-4 of first relay 52 is coupled in series with first relay contact 54-2 of second relay 54, both of which are coupled in parallel to first relay contact 58-2 of fourth relay 58. Detection circuit 50 may also include an alarm 62 coupled to first relay contact 58-2 of fourth relay 58.

In one embodiment, detection circuit 50 is powered by a first power source 64 independent of a second power source 66 that powers a solenoid valve (not numbered). The solenoid valve includes a valve contact 68 initially held at an open position. In one embodiment, power sources 64 and 66 provide an electrical voltage of approximately 24 voltages (V).

Detection circuit 50 may also include a photo coupler 70 electrically coupled to the solenoid valve and activated when the solenoid valve is activated. Photo coupler 70 includes a contact 70-2, initially held at an open position, coupled to first relay 52. As a result, activation of the solenoid valve activates first relay 52 through photo coupler 70. On the other hand, deactivation of the solenoid valve deactivates first relay 52 through photo coupler 70. In one embodiment, detection circuit 50 includes at least one of light emitting diodes 72, 74 and 76 to indicate the operational state of at least one of relays 52, 54, 56 and 58. Resistors $R_1$, $R_2$, $R_3$ and $R_4$ may be provided in detection circuit 50, each having a resistance of approximately 2.2 kilo-ohms.

Figure 3B:
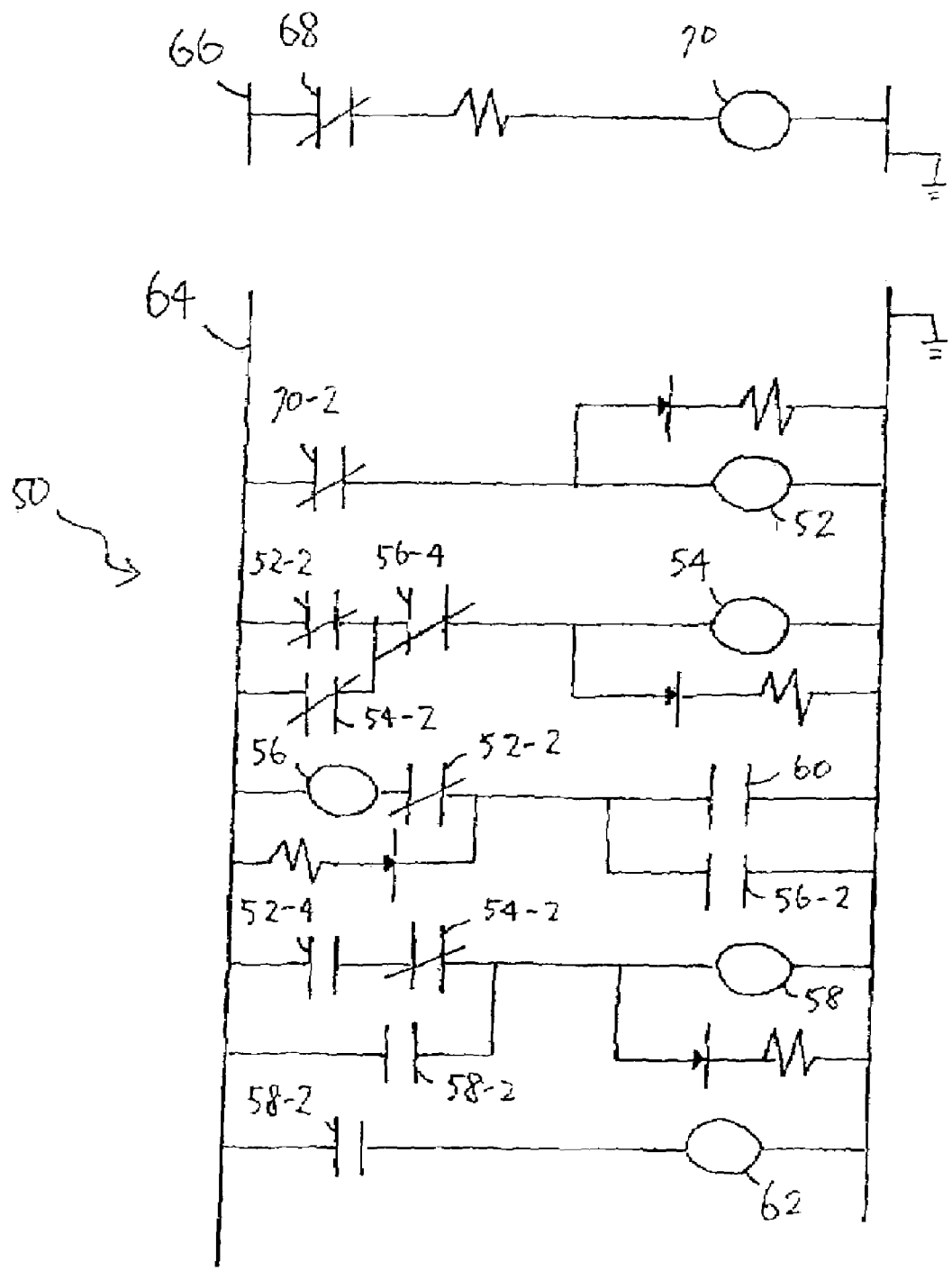

Referring now to FIG. 3B, in operation, when a coating process starts, the solenoid valve is activated to move valve contact 68 from the open position shown in FIG. 3A to a closed position, which activates photo coupler 70 and in turn first relay 52. Therefore, contact 70-2 of photo coupler 70 is moved into a closed position, and first relay contact 52-2 and second relay contact 52-2 are respectively moved into a closed and an open position. With first relay contact 52-2 of first relay 52 closed and second relay contact 56-4 of third relay 56 still held at an open position, second relay 54 is activated, resulting in first relay contact 54-2 of second relay 54 being moved to a closed position.

At the same time, a pump shaft (not shown) of a pump (not shown) is displaced by a stepping motor (not shown). Sensor contact 60 is now moved to a closed position until the sensor provides a signal that indicates whether the pump is operating properly. With sensor contact 60 still held at an open position, third relay 56 is not activated. In addition, with second relay contact 52-4 of first relay 52 open, fourth relay 58 is not deactivated.

Figure 3C:
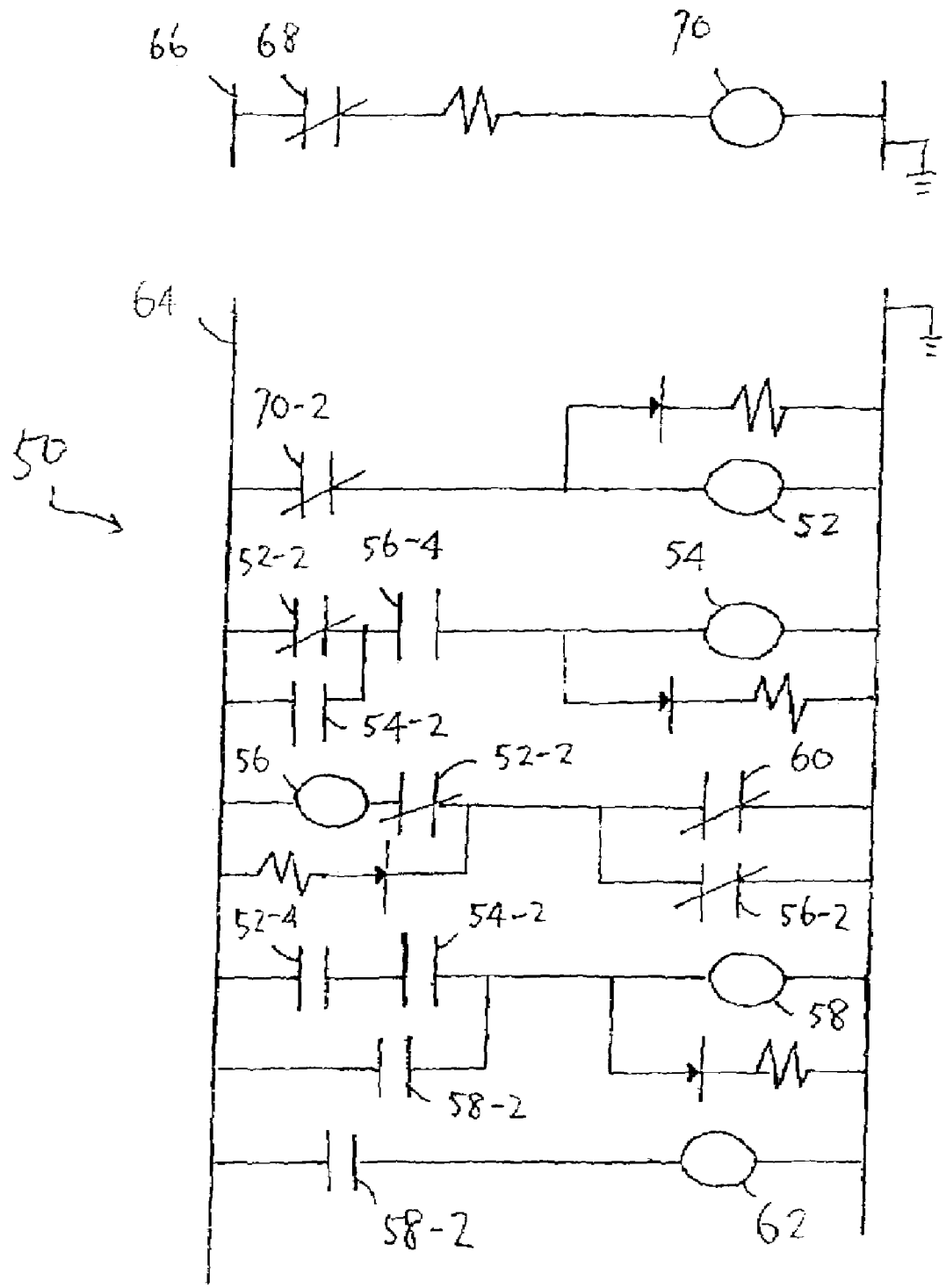
Figure 3D:
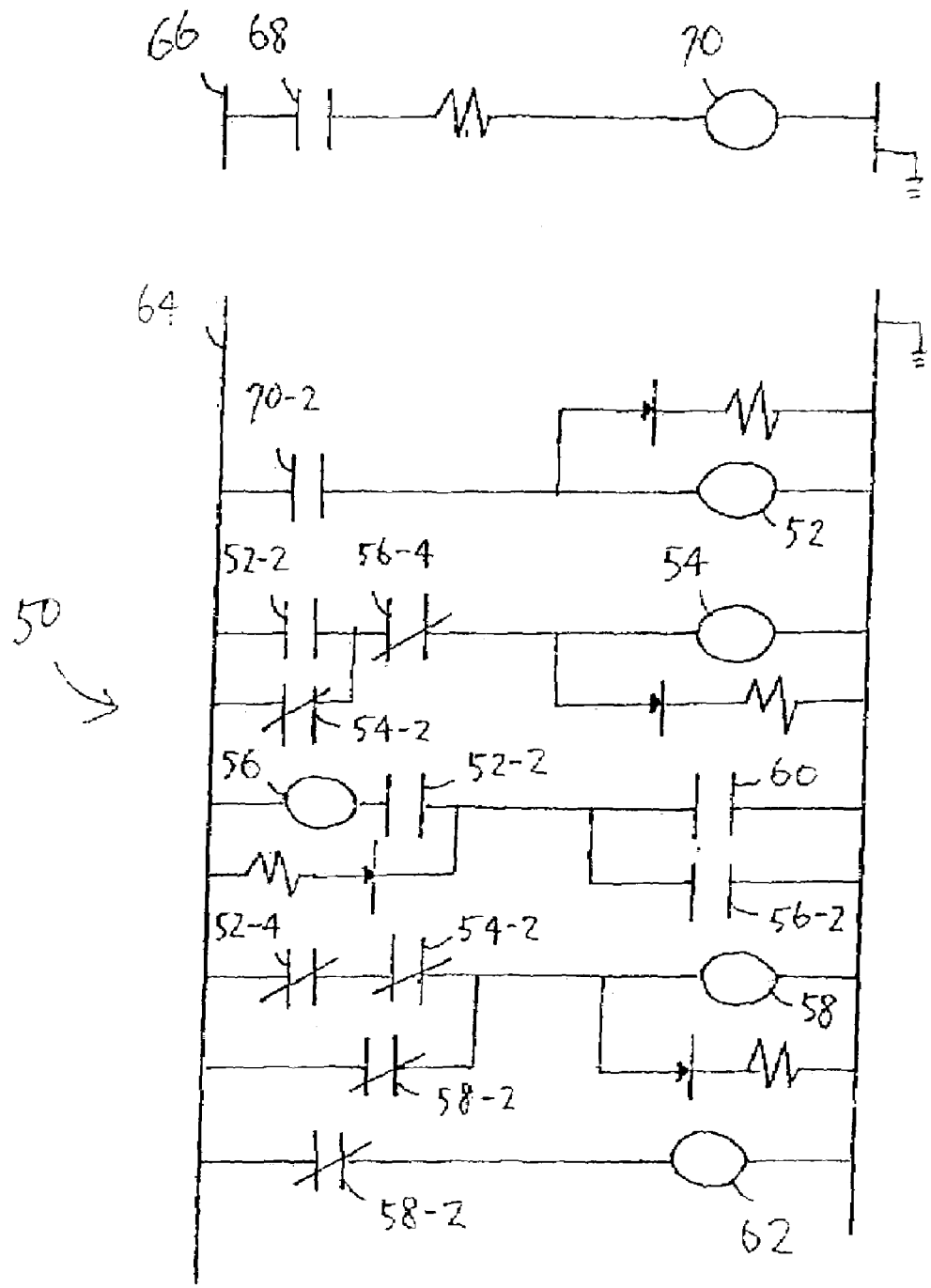

Referring to FIG. 3C, when the pump is operating properly, sensor contact 60 is moved to a closed position. With sensor contact 60 closed and first relay contact 52-2 of first relay 52 closed, third relay 56 is activated. First relay contact 56-2 and second relay contact 56-4 of third relay 56 are respectively moved into a closed and an open position. With second relay contact 56-4 of third relay 56 open, second relay 54 is deactivated. First relay contact 54-2 of second relay 54 is open. Furthermore, with second relay contact 52-4 of first relay 52 open or first relay contact 54-2 of second relay 54 open, fourth relay 58 is deactivated. FIGS. 3A to 3C show in time series how detection circuit 50 operates during normal operations of the pump. FIG. 3D shows how detection circuit 50 operates in response to a malfunction of the solenoid valve or pump.

When the pump malfunctions, the sensor does not provide the signal indicating proper operations, and therefore third relay 56 is deactivated during the coating process. Given the operational state as shown in FIG. 3B and with reference to FIG. 3D, when the coating process ends, valve contact 68 shown in FIG. 3B is moved into an open position, resulting in an open first relay contact 52-2 and a closed second relay contact 52-4 of first relay 52. With both second contact 52-4 of first relay 52 and first relay contact 54-2 of second relay 54 held at a closed position, fourth relay 58 is activated. First relay contact 58-2 is moved into a closed position, which then activates alarm 62 to sound an alarm. A signal indicating malfunction is sent to a dispense controller (not shown) to stop system from further operations.

Figure 4:
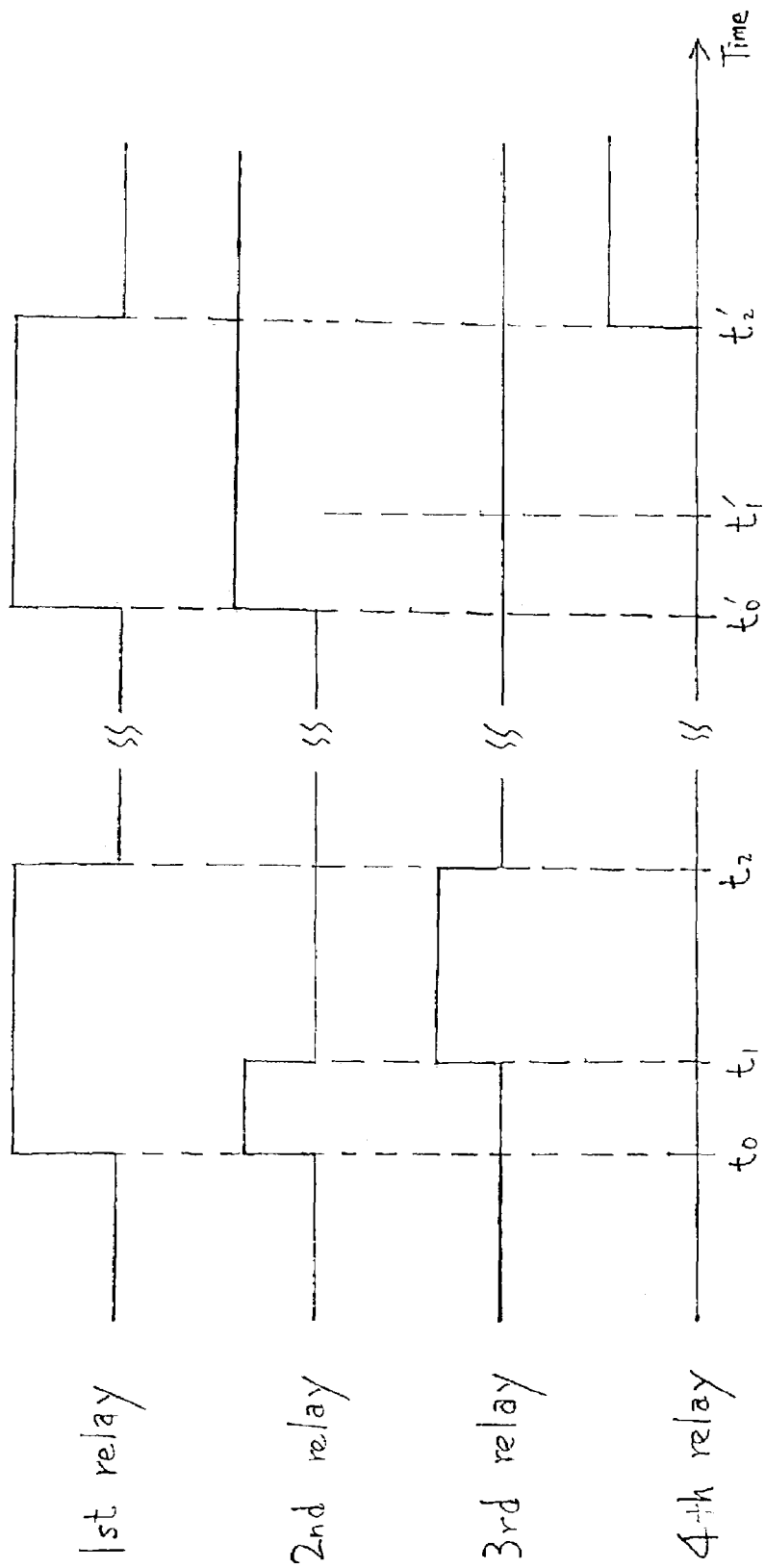
FIG. 4 is a timing diagram for the detection circuit shown in FIG. 3.

FIG. 4 shows a timing diagram for detection circuit 50 shown in FIGS. 3A to 3D. Referring to FIG. 4, at time $t_0$, first relay 52 is activated in response to activation of the solenoid valve, and second relay 54 is activated in response to the activation of first relay 52. At time $t_1$, the sensor detects proper pump operations and provides a signal to activate third relay 56. Meanwhile, the activation of third relay 56 deactivates second relay 54. At time $t_2$, the coating process comes to an end. Because fourth relay 58 is not activated during the coating process during the period from $t_0$ to $t_2$, the coating process is operating normally, as correspondingly shown in FIGS. 3A to 3C.

Referring again to FIG. 4, at time $t_0'$, first relay 52 is activated in response to the activation of the solenoid valve. Second relay 54 is activated in response to the activation of first relay 52. At time $t_1'$, however, the sensor does not detect proper pump operations and third relay 56 is not activated. As a result, second relay 54 is not deactivated and remains in the activated state. At time $t_2'$, the coating process comes to an end and first relay 52 is deactivated. Fourth relay 58 may be activated during $t_0'$ to $t_2'$ to indicate, through alarm device 62, that the coating process is malfunctioning (FIG. 3D).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A detection circuit, comprising:
    a first relay coupled to a solenoid valve for sensing an operation state of the solenoid valve;
    a second relay coupled to the first relay adapted for activating in response to activation of the first relay;
    a sensor for detecting an operation state of a device;
    a third relay coupled to the sensor, wherein the senor is adapted for providing a signal to activate the third relay, and wherein the second relay is deactivated in response to the activation of the third relay; and
    a fourth relay coupled to the first and second relays, wherein the fourth relay is activated when the first relay is deactivated and the second relay is activated.

2. The circuit of claim 1, wherein the device includes a pump.

3. The circuit of claim 1, wherein each of the first, second, third and fourth relays includes a first relay contact at an open position and a second relay contact at a closed position.

4. The circuit of claim 3, wherein the first relay contact of the first relay is coupled in parallel to the first relay contact of the second relay, and coupled in series with the second relay contact of the third relay.

5. The circuit of claim 3, wherein the first relay contact of the first relay is coupled in series with the sensor, and the first relay contact of the third relay is coupled in parallel to the sensor.

6. The circuit of claim 3, wherein the second relay contact of the first relay is coupled in series with the first relay contact of the second relay.

7. The circuit of claim 6, wherein the second relay contact of the first relay and the first relay contact of the second relay are coupled in parallel to the first relay contact of the fourth relay.

8. The circuit of claim 1, further comprising an alarm coupled to the fourth relay for activation by the activation of the fourth relay.

9. A system for dispensing a masking material in a semiconductor manufacturing process, comprising:
    a dispense controller for controlling dispensing of a layer of masking material;
    a pump including a solenoid valve operating in an activated state and a deactivated state; and
    a detection circuit electrically coupled to the dispense controller and the pump for detecting the operation of the pump and providing to the dispense controller a signal indicating the operation of the pump, the detection circuit including a first relay for providing a signal to the dispense controller to deactivate the system when the pump is operating outside specification of the pump,
    wherein the detection circuit further comprises a second relay coupled to the solenoid valve for sensing the state of the solenoid valve;
    a third relay coupled to the second relay and activated in response to the activation of the second relay;
    a sensor for sensing the operation of the pump; and
    a fourth relay coupled to the sensor and activated in response to a signal sent from the sensor, wherein the third relay is deactivated in response to the activation of the fourth relay.

10. The system as claimed in claim 9, wherein a first relay is coupled to second and third relays and activated in response to the deactivation of the second relay and the activation of the third relay.

11. The system of claim 9, wherein each of the first, second, third and fourth relays includes a first relay contact held at an open position and a second relay contact held at a closed position.

12. The system of claim 11, wherein the first relay contact of the second relay is coupled in parallel to the first relay contact of the third relay, and coupled in series with the second relay contact of the fourth relay.

13. The system of claim 11, wherein the first relay contact of the second relay is coupled in series with the sensor, and the first relay contact of the fourth relay is coupled in parallel to the sensor.

14. The system of claim 11, wherein the second relay contact of the second relay is coupled in series with the first relay contact of the third relay.

15. The system of claim 14, wherein the second relay contact of the second relay and the first relay contact of the third relay are coupled in parallel to the first relay contact of the first relay.

16. The system of claim 9, further comprising a buzzer coupled to the first relay and activated in response to the activation of the first relay.

17. A detection circuit, comprising:
    a first relay coupled to a solenoid valve, and activated and deactivated respectively in response to the activation and deactivation of the solenoid valve, the first relay including a first relay contact and a second relay contact;
    a second relay including a first relay contact and a second relay contact, the first relay contact of the second relay being coupled in parallel to the first relay contact of the first relay and coupled in series with the second relay contact of the first relay so that the second relay is activated in response to the activation of the first relay;
    a sensor coupled to a pump;
    a third relay including a first relay contact coupled in parallel to the sensor, and a second relay contact coupled in series with the first relay contact of the first relay, wherein the second relay is deactivated in response to the activation of the third relay; and a fourth relay including a first relay contact and a second relay contact, the first relay contact of the fourth relay being coupled in parallel to the second relay contact of the first relay and the first relay contact of the second relay so that the fourth relay is activated in response to the deactivation of the first relay and the activation of the second relay.

18. The circuit of claim 17, wherein the first relay contact and the second relay contact of the first, second, third and fourth relays are respectively held at an open position and a closed position when the relays are deactivated, and are respectively held at the closed position and the open position when the relays are activated.

19. The circuit of claim 17, further comprising at least one light emitting diode for indicating the operation state of at least one of the relays.

* * * * *